(12) United States Patent
Tidwell et al.

(10) Patent No.: US 7,725,716 B2
(45) Date of Patent: May 25, 2010

(54) METHODS AND SYSTEMS FOR ENCRYPTING, TRANSMITTING, AND STORING ELECTRONIC INFORMATION AND FILES

(75) Inventors: Justin Owen Tidwell, Aurora, CO (US); Karlton Mark Zeitz, Centenial, CO (US)

(73) Assignee: Japan Communications, Inc., Tokyo (JP)

( * ) Notice: Subject to any disclaimer, the term of this patent is extended or adjusted under 35 U.S.C. 154(b) by 1354 days.

(21) Appl. No.: 11/154,840

(22) Filed: Jun. 16, 2005

(65) Prior Publication Data
US 2005/0289655 A1    Dec. 29, 2005

Related U.S. Application Data (60) Provisional application No. 60/583,765, filed on Jun. 28, 2004, provisional application No. 60/653,411, filed on Feb. 16, 2005, provisional application No. 60/652,121, filed on Feb. 11, 2005.

(51) Int. Cl.
   *H04L 29/06* (2006.01)
   *G06F 7/04* (2006.01)
   *G06F 11/00* (2006.01)
(52) U.S. Cl. .............................. 713/168; 726/5; 726/27
(58) Field of Classification Search .................. 713/186; 726/5, 27
   See application file for complete search history.

(56) References Cited

U.S. PATENT DOCUMENTS

| | | | |
|---|---|---|---|
| 5,406,261 A | 4/1995 | Glenn | |
| 5,748,084 A | 5/1998 | Isikoff | |
| 5,936,526 A | 8/1999 | Klein | |
| 5,953,536 A | 9/1999 | Nowlin | |
| 5,958,058 A | 9/1999 | Barrus | |
| 6,070,240 A | 5/2000 | Xydis | |
| 6,198,920 B1 | 3/2001 | Doviak et al. | |
| 6,418,324 B1 | 7/2002 | Doviak et al. | |
| 6,418,533 B2 | 7/2002 | Angelo et al. | |
| 6,546,425 B1 | 4/2003 | Hanson et al. | |
| 6,564,047 B1 | 5/2003 | Steele et al. | |
| 6,643,701 B1 | 11/2003 | Aziz et al. | |
| 6,657,956 B1 * | 12/2003 | Sigaud | 370/230 |

(Continued)

FOREIGN PATENT DOCUMENTS

EP    0 849 909    6/1998

(Continued)

OTHER PUBLICATIONS

DOD, "Department of Defense Trusted Computer System Evaluation Criteria", The Rainbow Books, Dec. 26, 1985.

(Continued)

*Primary Examiner*—Techane J Gergiso
(74) *Attorney, Agent, or Firm*—Kilpatrick Stockton LLP (57) ABSTRACT

Methods and systems for securely requesting, retrieving, sending, and storing files. One aspect involves receiving a request for a file from a client device that identifies a user and the client device, encrypting the file using a session key based at least in part on the user and the client device, and transmitting the encrypted file to the client device. Other aspects of the invention include storing the encrypted file on the client device in encrypted form such that the file may only be decrypted or accessed by the particular user on that particular client device.

11 Claims, 4 Drawing Sheets

U.S. PATENT DOCUMENTS

| | | | |
|---|---|---|---|
| 6,658,114 B1 * | 12/2003 | Farn et al. | 380/277 |
| 6,725,379 B1 | 4/2004 | Dailey | |
| 6,813,498 B1 | 11/2004 | Durga et al. | |
| 6,865,162 B1 | 3/2005 | Clemm | |
| 6,880,079 B2 | 4/2005 | Kefford et al. | |
| 6,947,755 B1 | 9/2005 | Gould et al. | |
| 6,996,728 B2 | 2/2006 | Singh | |
| 7,003,282 B1 * | 2/2006 | Ekberg | 455/411 |
| 7,051,236 B2 | 5/2006 | Sanu | |
| 7,054,594 B2 | 5/2006 | Bloch et al. | |
| 7,089,425 B2 * | 8/2006 | Chan | 713/189 |
| 7,089,553 B1 * | 8/2006 | Glaser et al. | 717/178 |
| 7,107,349 B2 | 9/2006 | Britt, Jr. | |
| 7,170,999 B1 * | 1/2007 | Kessler et al. | 380/277 |
| 7,239,862 B1 | 7/2007 | Clare et al. | |
| 7,240,366 B2 * | 7/2007 | Buch et al. | 726/14 |
| 7,272,230 B2 * | 9/2007 | Sasaki | 380/278 |
| 7,305,548 B2 * | 12/2007 | Pierce et al. | 713/155 |
| 7,370,349 B2 * | 5/2008 | Holvey et al. | 726/5 |
| 7,389,123 B2 | 6/2008 | Rydgren et al. | |
| 7,392,390 B2 * | 6/2008 | Newcombe | 713/170 |
| 7,392,391 B2 * | 6/2008 | Eibach et al. | 713/175 |
| 7,409,061 B2 * | 8/2008 | Newcombe | 380/251 |
| 7,421,083 B2 * | 9/2008 | Medvinsky | 380/279 |
| 7,421,503 B1 | 9/2008 | Steiglitz et al. | |
| 7,437,550 B2 * | 10/2008 | Savage et al. | 713/156 |
| 7,549,048 B2 * | 6/2009 | Freeman et al. | 713/171 |
| 2002/0039359 A1 | 4/2002 | Gerszberg et al. | |
| 2002/0052968 A1 | 5/2002 | Bonefas et al. | |
| 2002/0099957 A1 | 7/2002 | Kramer et al. | |
| 2002/0133584 A1 | 9/2002 | Greuel et al. | |
| 2003/0005331 A1 | 1/2003 | Williams | |
| 2003/0051140 A1 | 3/2003 | Buddhikot et al. | |
| 2003/0056116 A1 | 3/2003 | Bunker et al. | |
| 2003/0084350 A1 * | 5/2003 | Eibach et al. | 713/201 |
| 2003/0204748 A1 | 10/2003 | Chiu | |
| 2003/0212548 A1 | 11/2003 | Petty | |
| 2003/0217166 A1 | 11/2003 | Dal Canto et al. | |
| 2003/0235307 A1 | 12/2003 | Miyamoto | |
| 2003/0236827 A1 | 12/2003 | Patel et al. | |
| 2004/0030887 A1 | 2/2004 | Harrisville-Wolff et al. | |
| 2004/0039807 A1 | 2/2004 | Boveda De Miguel et al. | |
| 2004/0052259 A1 | 3/2004 | Garcia et al. | |
| 2004/0064293 A1 | 4/2004 | Hamilton et al. | |
| 2004/0110488 A1 | 6/2004 | Komsi | |
| 2004/0123150 A1 | 6/2004 | Wright et al. | |
| 2004/0143470 A1 | 7/2004 | Myrick et al. | |
| 2004/0193694 A1 | 9/2004 | Salo et al. | |
| 2004/0235514 A1 | 11/2004 | Bloch et al. | |
| 2004/0259538 A1 | 12/2004 | Agbegnenou | |
| 2005/0020315 A1 | 1/2005 | Robertson | |
| 2005/0025184 A1 | 2/2005 | Dowling et al. | |
| 2005/0050323 A1 * | 3/2005 | Mizrah | 713/168 |
| 2005/0216736 A1 * | 9/2005 | Smith | 713/168 |
| 2005/0273592 A1 * | 12/2005 | Pryor et al. | 713/150 |
| 2006/0149414 A1 | 7/2006 | Archacki, Jr. et al. | |
| 2007/0125620 A1 | 6/2007 | Sorenson et al. | |

FOREIGN PATENT DOCUMENTS

| | | |
|---|---|---|
| EP | 0849909 | 6/1998 |
| EP | 0 886 409 A2 | 12/1998 |
| EP | 0 899 647 A2 | 3/1999 |
| EP | 0899647 | 3/1999 |
| EP | 1059782 | 12/2000 |
| EP | 1 320 013 A2 | 6/2003 |
| EP | 1320013 | 6/2003 |
| GB | 2210482 | 6/1989 |
| GB | 2 210 482 | 6/1999 |
| WO | WO 99/00958 | 1/1999 |
| WO | WO 00/05684 | 2/2000 |
| WO | WO 00/78004 | 12/2000 |
| WO | WO 01/35585 | 5/2001 |
| WO | WO 01/89249 | 11/2001 |
| WO | WO 02/23362 | 3/2002 |
| WO | WO 02/41580 | 5/2002 |
| WO | WO 02/077816 | 10/2002 |
| WO | WO 02/084938 | 10/2002 |
| WO | WO 02/091662 | 11/2002 |
| WO | WO 03/073782 | 9/2003 |
| WO | WO 2004/008693 | 1/2004 |
| WO | WO 2004/014011 | 2/2004 |
| WO | WO 2004/021114 | 3/2004 |
| WO | WO 2004/028069 | 4/2004 |
| WO | WO 2004/036864 | 4/2004 |
| WO | WO-2007109671 | 9/2007 |

OTHER PUBLICATIONS

Anonymous, "3$^{rd}$ Generation Partnership Project; Technical Specification Group Service and System Aspects; 3G Security; Wireless Local Area Network (WLAN) interworking security (Release 6)"; 3GPP TS 33.234, "Online!", Jun. 15, 2004; pp. 11-18, 20-22.

Matsunaga et al., "Secure Authentication System For Public WLAN Roaming"; WMASH 2003. Proceedings of the 1$^{st}$ ACM International Workshop on Wireless Mobile Applications and Services on WLAN Hotspots, San Diego, CA Sep. 19, 2003; pp. 113-121.

Gavi, Luciano; "Service Level Management for IP Networks"; 38$^{th}$ European Telecommunications Congress. Proceedings Networking the Future. Utrecht, NL Aug. 24-28, 1999, London: IBTE, GB, Aug. 24, 1999; pp. 106-109.

SNMP: Simple Network Management Protocol Des IAB; NTZ (Nachrichtentechnische Zeitschrift), VDE Verlag GmbH. Berlin, DE vol. 48, No. 6, Jun. 1, 1995 pp. 20-22.

International Search Report mailed Dec. 2, 2005 corresponding to PCT/US05/021370.

Matsunga, et al. "Secure Authentication System for Public WLAN Roaming" W Mash 2003, Proceedings of the 1$^{st}$ ACM International Workshop on Wireless Mobile Applications and Services on WLAN Hotspots, Sep. 19, 2003.

Anonymous: "3$^{rd}$ Generation Partnership Project: Technical Specification Group Service and System Aspects; 3G Security; Wireless Local Area Network (WLAN) Interworking Security (Release 6)," Jun. 15, 2004.

Gavi—Federation of Telecommunications Engineers of the European Community (FITCE)/ Institution of British Telecommunication: "Service Level Management for IP Networks," Aug. 24, 1999.

"SNMP: Simple Network Management Protocol DES IAB", Jun. 1, 1995.

Barberis, et al. "A Simulation Study of Adaptive Voice Communications on IP Networks," Computer Communications, May 1, 2001.

Homayounfar "Rate Adaptive Speech Coding For Universal Multimedia Access," IEEE Signal Processing Magazine, Mar. 2003.

Escobedo, et al. "Convivo Communicator: an Interface-Adaptive VoIP System for Poor Quality Networks," Journal of Information Communication & Ethics in Society (ICES), Jul. 2003.

Hoene, et al. "A Perceptual Quality Model for Adaptive VoIP Applications," Internet Article, Jul. 2004.

Mehrpour, et al. "Packet Voice Transmission Using Java Programming Language," Tencon '97, IEEE Region 10 Annual Conference, Dec. 2, 1997.

PCT International Search Report/Written Opinion for PCT/US2005/021370 dated Dec. 28, 2006.

PCT International Search Report/Written Opinion for PCT/US2005/021526 dated Dec. 28, 2006.

PCT International Search Report/Written Opinion for PCT/US2005/022586 dated Dec. 28, 2006.

PCT International Search Report/Written Opinion for PCT/US2005/022982 dated Dec. 28, 2006.

PCT International Search Report/Written Opinion for PCT/US2005/022983 dated Dec. 28, 2006.

PCT International Search Report/Written Opinion for PCT/US2005/022984 dated Dec. 28, 2006.

PCT International Search Report/Written Opinion for PCT/US2005/023278 dated Dec. 28, 2006.
PCT International Search Report/Written Opinion for PCT/US2005/023280 dated Dec. 28, 2006.
PCT International Search Report/Written Opinion for PCT/US2005/046665 dated Jul. 10, 2007.
PCT/US2005/021526 International Preliminary Report on Patentability dated Dec. 28, 2006.
PCT/US2005/022586 International Preliminary Report on Patentability dated Dec. 28, 2006.
PCT/US2005/022982 International Preliminary Report on Patentability dated Dec. 28, 2006.
PCT/US2005/022983 International Preliminary Report on Patentability dated Dec. 28, 2006.
PCT/US2005/022984 International Preliminary Report on Patentability dated Dec. 28, 2006.
PCT/US2005/023278 International Preliminary Report on Patentability dated Dec. 28, 2006.
PCT/US2005/023280 International Preliminary Report of Patentability dated Dec. 28, 2006.
PCT/US2005/046665 International Preliminary Report on Patentability dated Jul. 10, 2007.
PCT/US2007/064412 International Search Report dated Nov. 26, 2008.
PCT/US2005/022983 International Search Report dated Oct. 24, 2005.
PCT/US2005/022982 International Search Report dated Oct. 27, 2005.
PCT/US2005/022984 International Search Report dated Nov. 4, 2005.
PCT/US2005/023280 International Search Report dated Nov. 16, 2005.
PCT/US2005/022586 International Search Report dated Nov. 18, 2005.
PCT/US2005/021526 International Search Report dated Nov. 28, 2005.
PCT/US2005/021370 International Search Report dated Dec. 2, 2005.
PCT/US2005/023278 International Search Report dated Feb. 2, 2006.
PCT/US2005/046665 International Search Report dated Jul. 17, 2006.
PCT/US2005/021370 International Preliminary Report on Patentability dated Jan. 11, 2007.
United States Patent and Trademark Office U.S. Appl. No. 11/167,745 Non-Final Office Action mailed May 30, 2008.
United States Patent and Trademark Office U.S. Appl. No. 11/167,745 Response to Office Action dated Aug. 15, 2008.
United States Patent and Trademark Office U.S. Appl. No. 11/167,745 Non-Final Office Action mailed Nov. 14, 2008.
United States Patent and Trademark Office U.S. Appl. No. 11/170,608 Non-Final Office Action mailed Jul. 16, 2008.
United States Patent and Trademark Office U.S. Appl. No. 11/170,608 Response to Office Action dated Oct. 15, 2008.
United States Patent and Trademark Office U.S. App. No. 11/170,608 Final Office Action mailed Jan. 27, 2009.

* cited by examiner

METHODS AND SYSTEMS FOR ENCRYPTING, TRANSMITTING, AND STORING ELECTRONIC INFORMATION AND FILES

CROSS-REFERENCE TO RELATED APPLICATIONS

The present application claims priority to U.S. provisional application No. 60/583,765 entitled "Controlling Use of a Mobile Work Station Based on Network Environment," filed on Jun. 28, 2004, U.S. provisional application No. 60/653,411 entitled "Creating an Environment for Secure Mobile Access Anywhere" filed on Feb. 16, 2005 to Sanda et al., and U.S. provisional application No. 60/652,121 entitled "Remote Access Services" filed on Feb. 11, 2005 to Sanda et al.

FIELD OF THE INVENTION

The present invention relates generally to encryption and transmitting methods and, more particularly, to methods and systems for encrypting and transmitting electronic information and files.

BACKGROUND OF THE INVENTION

Computer users may request access to files or other electronic information from remote computer devices. For example, a user on a laptop computer connected to the Internet via a wireless connection may request a file located on a server that is also connected to the Internet. Providing a file or electronic information to a remote device introduces several security concerns. First, the files or electronic information may be intercepted during transmission. Even if the files and electronic information are encrypted, there are risks that an interceptor will be able to decrypt the encrypted files or information. Second, after transmission, the requested file or electronic information may be stored on the user's remote client device. If the remote client device is lost, stolen, or operated by a user who should not have access to the file or electronic information, there are risks of unauthorized access. Conventional methods address these issues separately. For example, some conventional applications provide encryption for transmission and others provide encryption for storage.

SUMMARY OF THE INVENTION

Embodiments of the present invention comprise methods and systems for securely providing files or other electronic information to a user on a remote client device. One aspect involves an access server receiving a request for a file from a client device that identifies a user and the client device, encrypting the file using a session key based at least in part on the user and the client device, and transmitting the encrypted file to the client device. Other aspects of the invention include storing the encrypted file on the client device in the same encrypted form such that the file may only be decrypted or accessed by the particular user on that particular client device.

Another aspect of the present invention includes a system having a server and a client device. The server is capable of receiving a request for a file from a user on the client device. The server is also capable of encrypting the requested file based at least in part on the user, the client device, and a session, and transmitting the file to the client device. The client device is capable of sending a request for the file to the server, receiving and decrypting the encrypted file from the server, and storing the file.

These illustrative embodiments are mentioned not to limit or define the invention, but to provide examples to aid understanding thereof. Additional illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for securely providing files or other electronic information to a user on a remote client device. There are multiple embodiments of the present invention. By way of introduction and example, one illustrative embodiment of the present invention provides a method for securely providing a file to a remote client device by various encryption techniques involving an access server key, a user/device key and a session key. In this example, the client device sends a file request to an access server. The file request is encrypted based on an access server key. The client device also sends a user/device key along with this encrypted file request. This user/device key itself is based on both a key associated with the particular user and a key associated with the particular device.

The file request that is received at the access server is decrypted using the access server key. The access server retrieves the file from storage, for example storage on a data server, and generates a session key. The session key is unique for the client, device, and session. The retrieved file is encrypted using the session key. The encrypted file and the session key are then together encrypted using the user/device key into a message that is sent to the client device.

The client device receives and decrypts the encrypted message using the client/device key. This yields the session key and the requested file, which is still session-key-encrypted. The session-key-encrypted file is stored locally on the hard drive of the client device. The session key is also stored locally. Access to the session key is restricted such that only the particular user on the particular machine can access the session key. Accordingly, only the particular user on that particular machine can decrypt the locally stored session-key-encrypted file. While the session-key-encrypted file may be decrypted for display and edit on the client device, it is never stored on the client device in an unencrypted form. Accordingly, in many embodiments, the requested file is not transmitted or stored in unencrypted form, reducing the data exposure risks that would otherwise be present.

This introduction is given to introduce the reader to the general subject matter of the application. By no means is the invention limited to such subject matter. Additional illustrative embodiments are described below.

System Architecture

Figure 1:
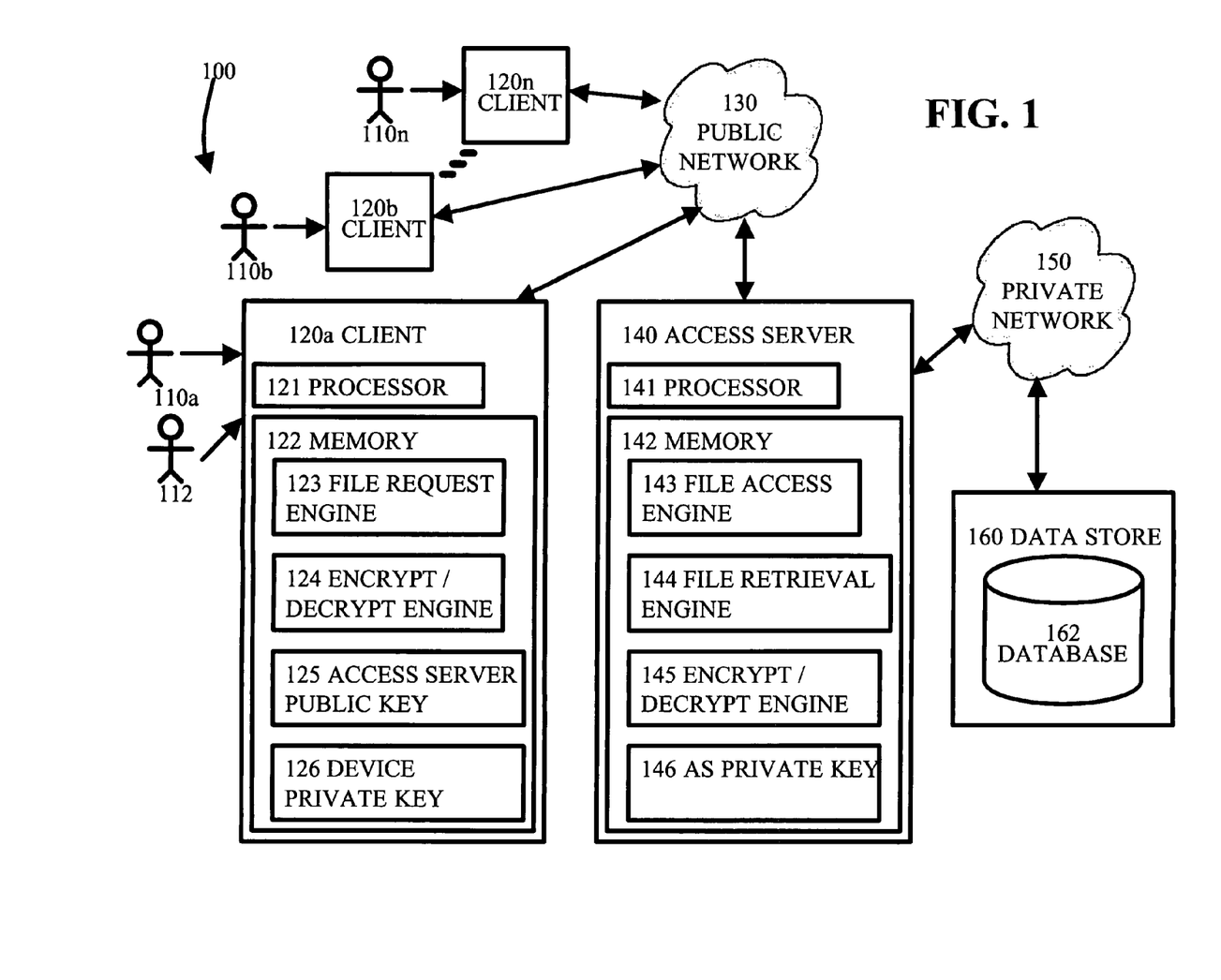
FIG. 1 shows a diagram of a system in accordance with one embodiment of the present invention.

Various systems in accordance with the present invention may be constructed. FIG. 1 is a diagram showing an illustrative system in which illustrative embodiments of the present invention may operate. The present invention may operate, and be embodied in, other systems as well. Referring now to the drawings in which like numerals indicate like elements throughout the several figures, FIG. 1 is a diagram showing an illustrative environment for implementation of an embodiment of the present invention. The system 100 shown in FIG. 1 comprises multiple remote client devices 120a-n in communication with an access server 140 through public network 130. The access server 140 is further connected through a private network 150 to a data store 160.

FIG. 1 illustrates a functional block diagram of client devices 120a-120n operating in accordance with various embodiments of the present invention. Client devices 120a-120n may be used by users 110a-110n for a variety of purposes and reasons. For example, a user, such as user 110a using client device 120a, may desire to use or run one or more local applications or retrieve files residing in the memory 122 of the user's client device 120a or may desire to remotely run applications or retrieve files residing on remote computers such as server 140 and data store 160.

Client Devices

In general, a client device 120a-n may use any suitable type of processor-based platform, and typically will include a processor 121 coupled to a computer-readable medium, such as memory 122, and include hardware and user interface components (not shown). The computer readable medium 122 can contain program code that can be executed by the processor. It can be used to store information and applications such as a file request engine 123, an encrypt/decrypt engine 124, an access server public key 125, a device private key 126, and various other encryption keys and files, among other things.

The client devices 120a-n themselves may have differing characteristics. The client devices 120a-n may include cell phone devices, mobile phone devices, smart phone devices, pagers, notebook computers, personal computers, digital assistants, personal digital assistants, digital tablets, laptop computers, Internet appliances, blackberry devices, Bluetooth devices, standard telephone devices, fax machines, other suitable computing devices, or any other suitable electronic device. Additional components in the client devices may differ and provide various functionalities.

The client devices 120a-120n may be connected to a network 130 in a variety of ways. The network 130 is not limited to any particular type of network nor is it limited to a single network. For example, the network 130 may be the Internet, a LAN, a WAN, a private network, a virtual network, or any combination of suitable network types.

Server Devices

The access server device 140 can comprise a server executing file access, file retrieval, encryption, decryption, and transmission functions. Data store 160 can comprise a server that stores a file or other electronic content, possibly in a database 162. The access server device 140 comprises a processor 141 and memory 142 containing a file access engine 143, a file retrieval engine 144, an encryption/decryption engine 145, and an access server private key 146. Examples of devices 140, 150 are servers, mainframe computers, networked computers, processor-based devices, and similar types of systems and devices.

Systems having different architecture than that which is shown in FIG. 1 are, of course, possible. For example, the devices 140, 150 depicted as separate computer systems each having one computer, may be implemented as a network of computer processors or combined into one single server. Access server device 140 and data store 160 may comprise a single physical or logical server. The system 100 shown in FIG. 1 is merely illustrative and is used to help explain the illustrative systems and processes discussed below.

File Request and Response

Figure 2:
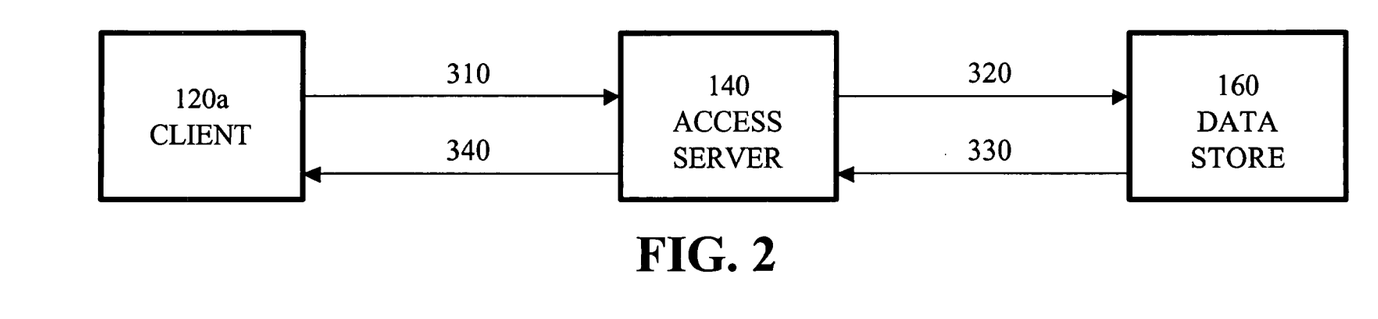
FIG. 2 shows a diagram of a system in accordance with one embodiment of the present invention.

FIG. 2 illustrates the flow of information in a file request and response scenario in an exemplary embodiment of the present invention. Client 120a sends a file request 310 to access server 140. In appropriate circumstances, access server 140 retrieves the requested file from a data store 160 by sending a request 320 and receiving the file in data store response 330. Access server 140 then provides the requested file to the client 120a in access server response 340. Each of these transmissions 310, 320, 330, 340 may be encrypted in a variety of ways, such as by encryption using an access server key, a client device key, a user key, a session key, a data store key, or various combinations of these keys.

Figure 3A:
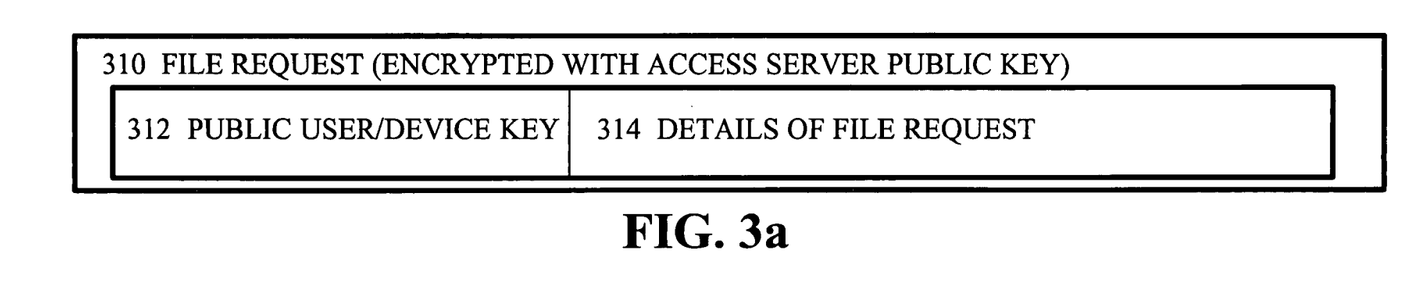
FIGS. 3a-b show an illustrative file request and response according to one embodiment of the present invention.
Figure 3B:
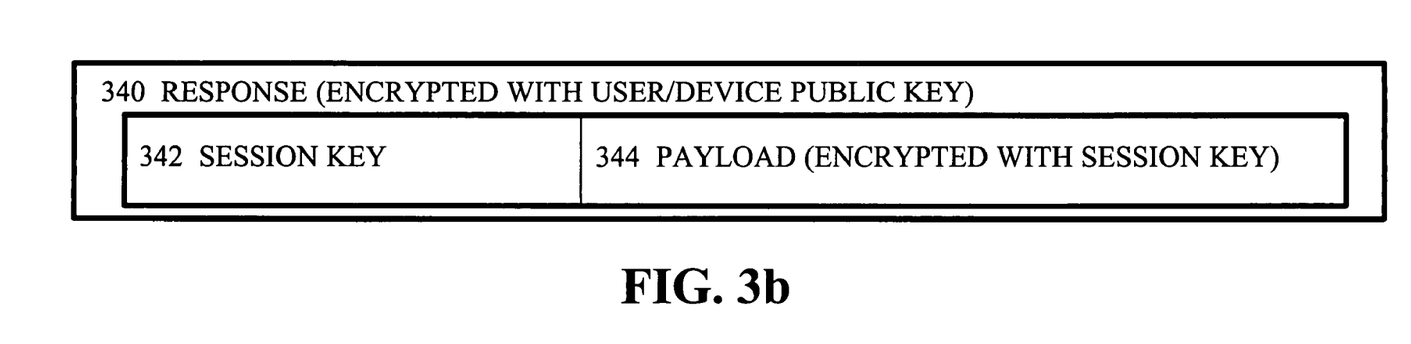
Figure 4:
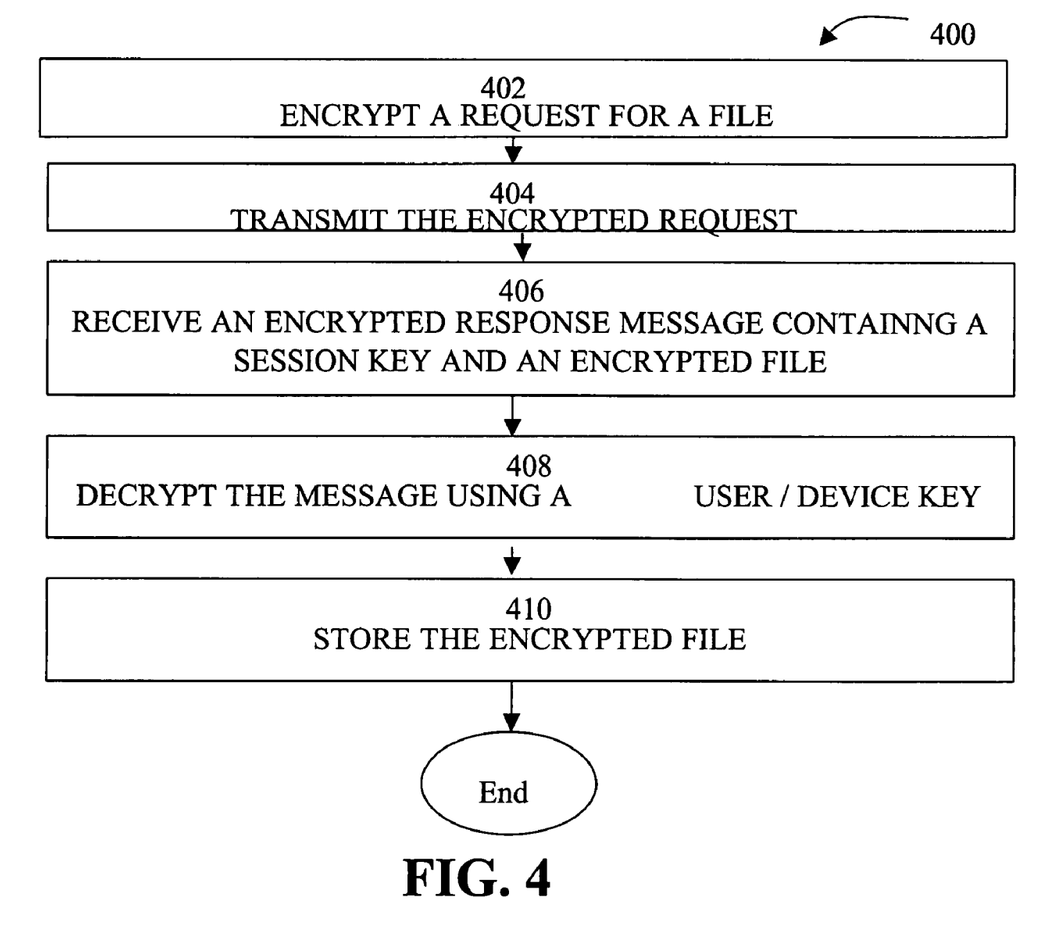
FIG. 4 shows an illustrative method according to one embodiment of the present invention.
Figure 5:
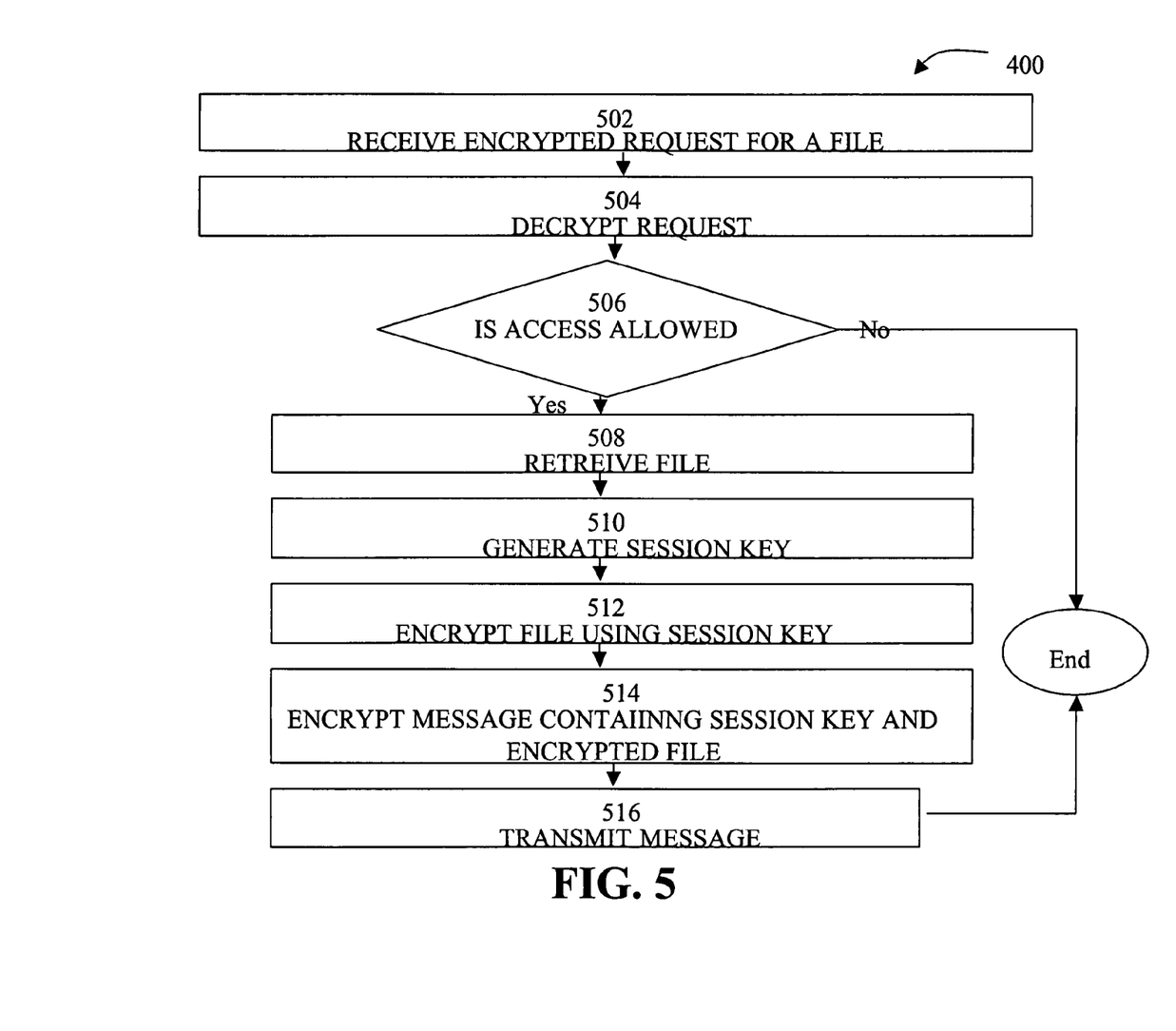
FIG. 5 shows an illustrative method according to one embodiment of the present invention.

Referring now to FIGS. 4 and 5, various methods in accordance with embodiments of the present invention may be used to securely provide a file to a remote client device 120a that requests the file. FIG. 4 shows a secure method of requesting and storing a remote file from a client device's perspective and FIG. 5 shows a secure method of receiving and responding to a request for a file from an access server's perspective. The following sections illustrate these exemplary methods as well as the use of various encryption keys to protect a file request, a file request response, and a locally stored file from unauthorized access. The systems and data structures shown in FIGS. 1, 2, and 3a and 3b and the methods shown in FIGS. 4 and 5 are used for illustration purposes only and are not meant to limit the scope of the invention. Accordingly, variations of the techniques and system components presented will be understood through examination of the following illustrative embodiments.

Exemplary Encryption Keys

In some embodiments, both the client devices 120a-n and the users 110a-n will have private keys. The individual users may be given private keys in a variety of ways depending on the operating, client-server, and other network environment factors. For example, in some cases each user 110a-n is created on a domain. During creation on the domain, a private key is established for each user 110a-n. When the user logs onto or otherwise begins operating a given client device through their domain, the client device is provided with the user's private key.

The client device keys may be created at the time of deployment of each client device 120a-n. For example, when the client software is installed or initialized, each device 120a-n may receive a private key that is stored locally on the client device 120a-n.

Likewise, when the access server software is installed or initialized, the access server 140 may also be given a private key. The access server public key may be distributed to the client devices 120a-n in a variety of ways. For example, upon installation or initialization of client software on the client devices 120a-n, the access server public key 125 may be distributed to and stored in the memory 122 of the client device 120a, as shown in FIG. 1.

Many of the embodiments discussed herein describe the use of asymmetric encryption techniques and algorithms, such as pretty good privacy or PGP algorithms. These techniques are used only for purposes of example and are not intended to limit the invention. Modifications of the present invention that use alternative encryption techniques will be understood through examination of the embodiments herein. Moreover, use of the term "key" is not meant to limit the scope of the invention. A key is a series of elements (typically alphanumeric letters and/or numbers) that enables use of an encryption algorithm to encrypt and decrypt data. Other identifying information may substitute for an encryption key in certain embodiments.

Exemplary Key Exchange During File Request

Referring now to FIG. 4, a client device 120a may request a file in a variety of ways and in a variety of circumstances. For example, a user 110a may select a file through a user interface on the client device 120a that displays or maps to a shared drive on a remote server. The client device 120a may compress and/or encrypt the request for the remotely located file as shown in block 402. In one embodiment, the file request is encrypted with the access server's 140 public key. The access server's 140 public key may be stored on the client device 120a at the time of deployment or otherwise made available on the client device 120a prior to the transmission of the file request 310.

In block 404, the encrypted file request 310 is sent from the client device 120a to the access server 140. The electronic transmission may include travel over the Internet, WANs, LANs, and/or any other suitable network or combination of networks.

Referring now to FIG. 3a, an exemplary file request 310 is illustrated. Such a file request could include a variety of information about the requested file, the client device 120a, the user 110a, and other pertinent information. For example, the first several bytes in the message 310 contain a user/device public key 312. The remainder of the message 310 contains the details of the file request 314. The details of the file request 314 may be any type of suitable information that identifies the file requested by the client device 120a.

The user/device public key 312, which is included as part of the file request 310 and an associated user/device private key may be derived in a variety of ways. For example, the user/device public key 312 could be derived from the associated user/device private key, which may be derived from the xor'ed user private key and client device private key. In some embodiments, the entire file request 314 will be encrypted, in other embodiments, some or all of the file request may not be encrypted. For example, public user/device key 312 will not be encrypted in some embodiments.

Exemplary File Request Receipt and Authentication

Referring now to FIG. 5, the access server 140 receives the file request 314 from the client device 120a as illustrated in block 502. Next, as shown in block 504, the file request 314 is decrypted. The access server 140 may, for example, use its own private access server key 146 to decrypt the file request 314. The information in the decrypted file request 310 will generally contain or allow the access server 140 to determine the identity of the client device 120a, the identity of the user 110a, the user/device public key 312, and the identity of the file being requested. For example, the access server 140 may determine the identity of the client device 120a and the user 110a by examining the user/device public key 312. Alternatively, the identity of the client device 120a and the user 110a may be provided separately within the file request 310.

Once the file request 310 is decrypted, the access server will typically determine if access to the file is allowed as shown in block 506. This determination may be based on a determination of whether the request is valid and appropriate given the user 110a and client device 120a. For example, the access server 140 may determine whether the file actually exists, whether the user 110a has permission to access to the requested file, whether the client device 120a has permission to access the file, and whether the file is available, among other things.

Exemplary File Storage and Access

Referring now to FIGS. 1, 2 and 5, if the requested file is available and the user 110a and the client device 120a have permission to access the file, the access server 140 may retrieve the file from storage, as shown in block 508, and send it to the client device 120a. The file may be stored locally on the access server 140 or remotely in a data store 160, such as a database 162. If stored remotely, a file retrieval engine 144 in the access server 140 may send a request 320 for the file to the data store 160 and receive an electronic copy of the file in response 330.

Data store 160 may be located on a private network 150, or, alternatively, on a public network such as the Internet. In the case of a private network 150, in most cases the access server's file request 320 and the data store's response 330 will not need to be encrypted. In the case of a public network, the request 320 and response 330 will generally be encrypted to protect the request and file against unauthorized capture. Such encryption may be by convention encryption techniques or utilize the techniques taught herein, i.e., by encryption using a session key 342 generated by the access server 140.

Exemplary Access Server Responses

Referring again to FIGS. 1 and 2, the access server 140 may provide a variety of responses to a file request or no response at all. No response may be necessary in some circumstances, such as when the access server 140 determines that the file request is corrupt. In many circumstances, however, the access server 140 will generate an appropriate response, compress the response, encrypt the compressed response, and/or send it to the client device 120a. The response 340 may include the requested file, which may itself be encrypted, and/or information about the request for the file. As examples, an error message, an "access denied" message, a "file unavailable" message, or a "file not found" message may be transmitted to the client device 120a. These messages 340 may be encrypted by an encrypt/decrypt engine 145 with user/device public key 312.

Referring now back to FIG. 5, in the case where the access server's response 340 involves sending the requested file to the client device 120a, various encryption techniques according to the present invention are available to protect the requested file from unauthorized access and/or unnecessary exposure. In one embodiment, a session key 342 is generated by the access server 140, as shown in block 510.

Referring now to FIGS. 3b and 5, the payload 314, which contains the requested file, is encrypted using the session key 342, as shown in block 512. This payload 314 along with the session key 342 are then encrypted into message 340 using the user/device public key 312, as shown in block 514. In other words, in some embodiments, the access server 140 appends the session key 342 to the compressed and encrypted payload 314 into a message 340, and encrypts the entire message 340. The response 340 is then sent or otherwise transmitted to the client device 120a, as shown in block 516.

Generation of a Session Key

The access server 140 may generate a session key 342 in a variety of ways. For example, the session key may be created based on the identity of the client device 120a, the user 110a, and/or the particular connection session. Alternately, the session key can be a pseudo-randomly generated number, seeded perhaps with a timestamp. The primary characteristic of a session key, regardless of its generation, is that it cannot be derived from any other key in the system and that it can be realistically considered unique. The session key 342 may be timed to expire after a given time and/or may be automatically destroyed or erased when the user 110a logs off of or otherwise terminates use of the client device 120a.

Receiving the File on the Client Device

Referring now to FIGS. 2 and 4, the client device 120a may receive the response 340 from the access server 140, as shown in block 406. In block 408, the client device 120a may attempt to decrypt the message 340 with the user/device private key associated with the user/device public key 310. If the user has changed, this decryption will fail as the correct user/device private key will not be available for decryption. For example, if the private key is generated on the fly as the result of the xor between the current user's private key and the client device's private key, a different user/device private key will be generated for each user and client device combination. A second user 110b will not be able to generate the correct user/device private key and thus will not be able to decrypt the response 340. Failed decryptions will generally be recorded in a decryption log and the user may or may not be notified of the failure.

Assuming that the decryption is successful, the client device 120a will next retrieve the session key 342 and use it to decrypt the encrypted payload 314 containing the requested file or related message. If the response 340 or any of its subparts such as the session key 342 or payload 314 are compressed, the client device 102a may also uncompress the content as required.

If the response 340 indicates that the requested file was unavailable or that some error condition occurred, the user 110a may be notified immediately, for example, in a dialog or popup window.

If the response 340 indicates that the file is contained therein, the file may be re-encrypted, generally by itself, with the provided session key 342 and stored in the memory 122 of the client device 120a, as shown in block 410. In some embodiments, the session key 342 is stored in a secure location in memory 122 along with a reference to the file. In some embodiments, the session-key-encrypted requested file will be stored on the client device 120a prior to decryption.

Once the encrypted file is stored in the client device memory 122, the file may be launched by initiating or executing any necessary operating system and/or application function. Thus, in many embodiments, while the requested file may be displayed in decrypted form through the applications and operating system on the client device 120a, the requested file is always stored in encrypted form.

Modifying the File

If the user makes any alterations to the file, the alterations are saved by creating a new file that is also encrypted with the session key 342. The changed file may also be saved to the remote data store 160 in a variety of ways according to the present invention. In some embodiments, the user 110a will initiate the remote save function through the application or operating system. For example, a user 110a may select a "File->Save As" function. The client software residing in memory 122 will generally confirm that the user 110a has the appropriate privileges to write changes to the file. The client device 120a may then initiate a compressed, encrypted request to the server with the change to the file or a changed version of the file. The payload of this request will typically be encrypted with the session key 342 for that file, while the request will typically be encrypted with the server's public key, and, in addition to the changed file, may include identifiers of the user 110a and client device 120a.

Upon receiving this request from the client device 120a, the access server 140 will decrypt the request with the server private key. If the server cannot decrypt the request, then it may log the event, dump the request, and/or send a response. After successful decryption of the request, the access server 140 may use the session key to decrypt the file, the access server 140 may validate the user 110a and client device 120a credentials supplied, then, based on the user's 110a privileges, either overwrite the file stored on the data store 160 and generate a success response or generate an error response. The error response will generally include a unique identifier for the server. The error response will generally be compressed and encrypted with the user/device public key and sent back to the client device 120a.

Upon receipt of the message, the client device may attempt to decrypt it with the user/device private key. If no user/device private key exists, then the situation should be logged, and the message should be dropped with or without user notification. If decryption is successful, the message should be decompressed and displayed to the user 110a.

There are many advantages to implementing file request, retrieval, and storage systems and techniques according to the teachings of the present invention. For example, in many embodiments the file will only be accessible to the specific user on the specific machine. Thus, if the client device 120a is lost or stolen, the encrypted file will not be accessible to the finder or thief. Moreover, if the file is transferred to another device, it will not be accessible even by the same user. This prevents the unauthorized dissemination of sensitive data.

Another advantage in some embodiments is that a file intercepted during transmission may have multiple layers of encryption. In many embodiments, both the response message 340 and the file contained within the message's payload 344 may be separately encrypted. The multiple layers of encryption make it more difficult for an interceptor or hacker to get to the underlying file. As another example, the present invention may be used in combination with additional encryption techniques, such as conventional encryption techniques and/or techniques disclosed in the application entitled "Systems and Methods for Mutual Authentication of Network Nodes," filed concurrently with this application Ser. No. 11/154,800, and incorporated herein in its entirety by this reference. Additional layers of encryption provide additional security.

Another advantage is created in some embodiments in which the session key is created with a set expiration time. Once time expires, the user 110*a* will not be able to access the file. This further protects the file stored on the local device from unauthorized use and interception.

General

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method comprising:
    receiving a request for a file and receiving a user and device key, wherein the request identifies a user and a client device that sent the request and the user and device key;
    generating a session key that is unique for the user, device, and session;
    creating a session-key-encrypted file by encrypting the file using the session key;
    creating an encrypted message by encrypting the session-key-encrypted file and the session key together using the user and device key; and
    transmitting the encrypted message to the client device, wherein the client device decrypts the encrypted message, stores the session-key-encrypted file, stores the session key, and restricts access to the session key such that the session key is only provided to the user on the client device, wherein, after the session and communication to the client device has ended, the session-key-encrypted file and the session key are only available for use by the user on the client device.

2. The method of claim 1, wherein the request for the file and the user and device key that are received are received encrypted.

3. The method of claim 1 further comprising retrieving the file from a database prior to encrypting the file.

4. The method of claim 1 further comprising determining whether the user has access to the file prior to encrypting the file.

5. A method comprising:
    sending a request for a file and sending a user and device key from a client device to a server wherein a user is using the client device;
    receiving the file from the server, wherein the file is encrypted in an encrypted message, wherein the encrypted message was encrypted using the user and device key;
    decrypting the encrypted message to retrieve a session-key-encrypted file and a session key unique for the user, device, and session, the session-key-encrypted file comprising the requested file that was encrypted by the server using the session key; and
    storing the session-key-encrypted file and the session key on the client device, and restricting access to the session key such that the session key is only provided to the user on the client device, wherein, after the session and communication to the client device has ended, the session-key-encrypted file and the session key are only available for use by the user on the client device.

6. The method of claim 5 wherein the request is encrypted based on a public key associated with the server.

7. A computer readable storage medium having program code stored thereon and executable by a device, comprising:
    program code for receiving a request for a file and receiving a user and device key, wherein the request identifies a user and a client device that sent the request and the user and device key;
    program code for generating a session key that is unique for the user, device, and session;
    program code for creating a session-key-encrypted file by encrypting the file using the session key;
    program code for creating an encrypted message by encrypting the session-key-encrypted file and the session key together using the user and device key; and
    program code for transmitting the encrypted message to the client device, wherein the client device decrypts the encrypted message and stores the session-key-encrypted file, stores the session key, and restricts access to the session key such that the session key is only provided to the user on the client device, wherein, after the session and communication to the client device has ended, the session-key-encrypted file and the session key are only available for use by the user on the client device.

8. The computer readable storage medium of claim 7 having program code for decrypting the request for the file.

9. The computer readable storage medium of claim 7 having program code for retrieving the file from a database prior to encrypting the file.

10. The computer readable storage medium of claim 7 having program code for determining whether the user has access to the file prior to encrypting the file.

11. A computer readable storage medium having program code stored thereon and executable by a device, comprising:
    program code for sending a request for a file and sending a user and device key from a client device to a server, wherein a user is using the client device;
    program code for receiving the file from the server, wherein the file is encrypted in an encrypted message, wherein the encrypted message was encrypted using the user and device key;
    program code for decrypting the encrypted message to retrieve a session-key-encrypted file and a session key unique for the user, device, and session, the session-key-encrypted file comprising the requested file that was encrypted by the server using the session key; and
    program code for storing the session-key-encrypted file and the session key on the client device, and restricting access to the session key such that the session key is only provided to the user on the client device, wherein, after the session and communication to the client device has ended, the session-key-encrypted file and the session key are only available for use by the user on the client device.

* * * * *